(12) United States Patent
Murthy et al.

(10) Patent No.: US 9,802,847 B2
(45) Date of Patent: Oct. 31, 2017

(54) METHOD AND APPARATUS FOR WASTEWATER TREATMENT USING SCREENS

(71) Applicant: D.C. Water & Sewer Authority, Washington, DC (US)

(72) Inventors: Sudhir N. Murthy, Herndon, VA (US); Eugenio Giraldo, Robbinsville, NJ (US); Norman D. Dockett, Silver Spring, MD (US); Walter F. Bailey, Washington, DC (US)

(73) Assignee: D.C. Water & Sewer Authority, Washington, DC (US)

( * ) Notice: Subject to any disclaimer, the term of this patent is extended or adjusted under 35 U.S.C. 154(b) by 0 days.

(21) Appl. No.: 14/033,686

(22) Filed: Sep. 23, 2013

(65) Prior Publication Data

US 2014/0131273 A1 May 15, 2014

Related U.S. Application Data

(60) Provisional application No. 61/703,844, filed on Sep. 21, 2012.

(51) Int. Cl.
*C02F 3/00* (2006.01)
*C02F 3/12* (2006.01)
(Continued)

(52) U.S. Cl.
CPC ............... *C02F 3/00* (2013.01); *B01D 36/00* (2013.01); *C02F 3/006* (2013.01); *C02F 3/12* (2013.01); *C02F 3/1205* (2013.01); *C02F 3/1236* (2013.01); *C02F 3/2866* (2013.01); *C02F 3/1221* (2013.01); *C02F 3/1226* (2013.01);
(Continued)

(58) Field of Classification Search
USPC ........ 210/614, 615–616, 768, 784, 790, 189
See application file for complete search history.

(56) References Cited

U.S. PATENT DOCUMENTS 3,467,699 A * 9/1969 Bamforth ............. B01D 9/0013
562/494
3,747,771 A * 7/1973 Ruthrof ................ B01D 29/118
210/409
(Continued)

FOREIGN PATENT DOCUMENTS

CN 2166870 Y 6/1994
CN 101300196 11/2008
(Continued)

OTHER PUBLICATIONS

Curvers, "Compressibility of biotic sludges—an osmotic approach," Chem. Eng. J., 166 (2011) p. 678-686.*
(Continued)

*Primary Examiner* — Chester Barry
(74) *Attorney, Agent, or Firm* — Blank Rome LLP

(57) ABSTRACT

An apparatus and method for selecting and retaining solids in an activated sludge process for the improving wastewater treatment using screens. The screens can be used to separate and retain solids based on size or compressibility. The screens are used to separate and select for slow growing organisms, faster settling organisms, or materials added to absorb, treat or remove constituents in the activated sludge process.

23 Claims, 6 Drawing Sheets

(51) Int. Cl.
  *B01D 36/00* (2006.01)
  *C02F 3/28* (2006.01)
  *C02F 3/30* (2006.01)

(52) U.S. Cl.
  CPC ........ *C02F 3/307* (2013.01); *C02F 2209/005* (2013.01); *C02F 2209/10* (2013.01); *C02F 2209/105* (2013.01); *C02F 2303/24* (2013.01); *Y02E 50/343* (2013.01); *Y02W 10/15* (2015.05)

(56) References Cited

U.S. PATENT DOCUMENTS

| | | | |
|---|---|---|---|
| 3,959,124 A | 5/1976 | Tchobanoglous | |
| 4,014,747 A * | 3/1977 | Kenyon | C12M 25/02 435/287.1 |
| 4,236,999 A * | 12/1980 | Burgess | B01D 33/067 209/240 |
| 4,725,364 A * | 2/1988 | Hurley | B01D 29/115 210/497.3 |
| 5,361,909 A * | 11/1994 | Gemmer | 209/12.1 |
| 5,397,755 A * | 3/1995 | Parker | C02F 3/10 210/615 |
| 5,824,222 A | 10/1998 | Keyser et al. | |
| 5,910,245 A * | 6/1999 | Bernhardt | B09C 1/002 210/170.07 |
| 6,569,335 B1 * | 5/2003 | Johnson | C02F 3/006 210/103 |
| 6,814,868 B2 | 11/2004 | Phagoo et al. | |
| 7,070,693 B2 * | 7/2006 | Kelly | 210/609 |
| 7,569,147 B2 * | 8/2009 | Curtis | C02F 3/12 210/607 |
| 7,611,632 B1 * | 11/2009 | Wang | C02F 1/56 210/698 |
| 2003/0006200 A1 | 1/2003 | Phagoo et al. | |
| 2007/0085998 A1 * | 4/2007 | Brestel | G01J 3/2889 356/73 |
| 2008/0314828 A1 * | 12/2008 | Campbell | 210/609 |
| 2010/0006501 A1 * | 1/2010 | Laurell | A61M 1/3693 210/635 |
| 2010/0264082 A1 * | 10/2010 | Conner | 210/620 |
| 2011/0017664 A1 | 1/2011 | Conner et al. | |
| 2011/0036771 A1 * | 2/2011 | Woodard | C02F 3/2846 210/608 |
| 2011/0186513 A1 * | 8/2011 | Vuong | B01D 61/04 210/636 |
| 2013/0069759 A1 * | 3/2013 | Padgett | G01N 23/04 340/5.6 |
| 2013/0277302 A1 * | 10/2013 | Doelle et al. | 210/609 |
| 2014/0224730 A1 * | 8/2014 | Conner et al. | 210/616 |
| 2014/0309607 A1 * | 10/2014 | Richlen | A61F 13/531 604/367 |

FOREIGN PATENT DOCUMENTS

| | | |
|---|---|---|
| CN | 101479200 | 7/2009 |
| CN | 102066269 | 5/2011 |
| CN | 102548911 | 7/2012 |
| JP | 2000343098 | 12/2000 |
| JP | 2003093908 | 4/2003 |
| JP | 2005349304 | 12/2005 |
| JP | 2006035069 | 2/2006 |
| JP | 2012106176 | 6/2012 |
| KR | 2007076919 A * | 7/2007 |

OTHER PUBLICATIONS

Singapore Written Opinion, dated Mar. 24, 2016, pp. 1-5, issued in connection with corresponding Singapore Application 11201502140T.

Singapore Written Opinion, dated Nov. 15, 2016, pp. 1-4, issued in connection with corresponding Singapore Application 11201502140T.

Chinese Office action dated Feb. 26, 2016, issued in connection with corresponding Chinese Application 201380049244.2.

English Translation of the Chinese Office action dated Feb. 26, 2016, issued in connection with corresponding Chinese Application 201380049244.2.

Japanese Office Action and its English-language translation dated May 9, 2017, issued in connection with corresponding Japanese Application 2015-533255.

* cited by examiner

METHOD AND APPARATUS FOR WASTEWATER TREATMENT USING SCREENS

This application claims the benefit of U.S. Provisional Patent Application No. 61/703,844, filed Sep. 21, 2012. The entire disclosure of U.S. Provisional Patent Application No. 61/703,844 is incorporated herein by reference.

BACKGROUND

Screening of wastewater is a common method of treatment at wastewater treatment plants. Wastewater screens have been used to remove large or inert solids for collection and disposal for over a century. Wastewater screening to remove such debris typically occurs prior to the activated sludge process. More recently, screening has also been conducted within the activated sludge process itself to select and remove inert material. U.S. Pat. Nos. 4,541,933, 5,824,222 and 7,569,147 each discuss variations of this concept for the removal of inert-materials from activated sludge. Another use of screens is described in U.S. Pat. No. 3,959,124, in which screened activated sludge solids can be returned to increase the solids retention time and the capacity of the overall process. In this process, the focus is on retention of activated sludge generally and not on selection of particular constituents in the activated sludge. None of these previously disclosed processes uses screens for both 'selection' and 'retention' of solids.

A current operational drawback of an activated sludge process is that the solids retention time is the same for all of the fractions in the activated sludge. This drawback has been overcome, for example, by using plastic media to retain organisms on biofilms for longer solids residence times. See, e.g., U.S. Pat. Nos. 5,458,779 and 7,854,843. Other options include the use of cyclones that can differentiate based on specific gravity. An improved selection process for retaining particular constituents of the activated sludge is desired.

SUMMARY OF THE INVENTION

The disclosed embodiments include a selection process using screens for retaining particular constituents based on size and compressibility thereof. In particular, screens are used in the activated sludge process to mine and retain specific types of solids, and these retained solids are used to improve process performance. This ability to mine activated sludge through selection and retention of material is a key feature of the embodiments of the invention.

DETAILED DESCRIPTION

Figure 1A:
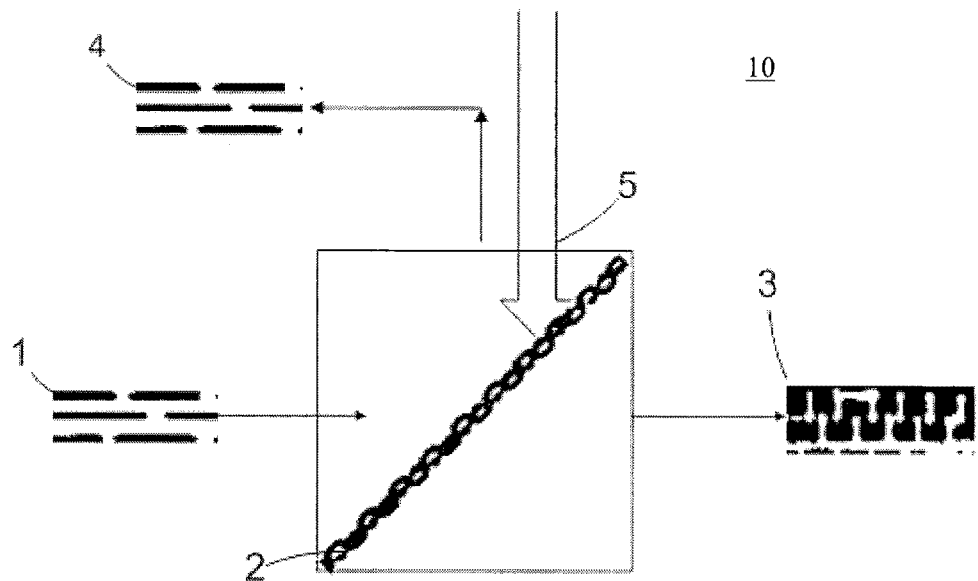
FIGS. 1(a)-1(c) show a screening apparatus according to an example embodiment, including a screen wash from three different angles.

The disclosed embodiments provide a screen to select and retain particles in activated sludge based on particle size or compressibility. The size of the particles retained depends on the size of the screen mesh, in the 10-1000 micron size range. The ability to selectively retain compressible or non-compressible material depends on the washing volume and velocity, and/or the amount of tangential shear applied or force applied perpendicularly. The compressible material tends to pass through the screen as it is washed or sheared. For example, larger sized granules can be retained compared to smaller sized flocs or granules based on mesh size.

An additional feature disclosed herein will retain flocs or granules based on an upper and lower bound screen mesh size. A specific granule/particle size range may be retained by discarding very large granules or trash in a larger mesh size screen following which, very small granules are allowed to pass through in a smaller mesh screen. Thus, a single or multiple screens in series could be used for selective retention and/or pass through of size fractions as desired.

The screens may also be employed for selecting and retaining chemically reactive material used for the mining, treatment or removal of dissolved constituents in wastewater and activated sludge. Finally, the screens can be used for selecting aerobic or anaerobic granular microorganisms. The disclosed embodiments solve various needs for selective retention of portions of activated sludge, as discussed in more detail below.

Selecting Large-Sized Activated Sludge Particles.

Large-sized particles of equal density settle faster than smaller sized particles. A screen may be used to select for larger-sized particles. Increased settling rates is beneficial to treatment plants as this increase can improve capacity utilization of the activated sludge process. Larger aggregates enable organizational structures not present in smaller flocs.

Select and Retain Chemically Reactive Material.

Sometimes, there is a Need to Add chemically reactive material to activated sludge. For example activated carbon, ion exchange resins or metal/non-metal catalysts can be added to sorb, treat, react or mine soluble microconstituents or ions from wastewater or activated sludge. These chemically reactive materials can be added to the activated sludge tanks. The subsequent selective retention and or removal of materials such as activated carbon, catalysts and ion exchange resins can be facilitated using screens.

Select and Retain Biologically Active Material.

Bacteria or other microorganisms can form aerobic or anaerobic granules. These granules can be selected and retained within the activated sludge process by screens. For example, the selection and retention of slow growing autotrophic anaerobic ammonium oxidizers (anammox) granules can be accomplished using screens. Screens can also help develop a selection process for the management of granular or flocculant fractions in an activated sludge tank.

Several types of screens are available for use in the disclosed embodiments including rotary/drum screens, step screens, vibrating screens or stationary screens.

The first aspect disclosed herein provides a screen to retain material based on particle size. Larger size particles settle faster (based on Stokian settling), allowing for the rapid removal of the material in the separation device.

The second aspect disclosed herein provides a means for the selection and retention of biologically inert material that is added to the activated sludge process for the removal of ions or microconstituents. These biologically inert materials may be activated carbon, ion exchange resin, or any other material added to the process for treating or mining. For example, pollutants, such as estrogenic compounds or pharmaceuticals could be selectively removed through the retained activated carbon. Alternatively, ion exchange resins could be used to remove ammonia or phosphorus. Other inert material could be used to improve the physical characteristics of activated sludge (e.g., to improve settleability) and then be selectively retained using screens.

In a third aspect disclosed herein, biological granules can be selected and retained on screens. For example, slow growing granular autotrophic organisms can be retained on screens while faster growing non-autotrophic organisms are allowed to pass through. As a specific example, granular anaerobic ammonium oxidizers (anammox) may be selectively retained onto screens while allowing compressible flocculant organisms to pass through. These enriched and retained organisms can also be bioaugmented to other treatment processes.

The use of the screens of the disclosed embodiments is not intended to retain attached growth like plastic media (as described in U.S. Pat. Nos. 5,458,779 and 7,854,843). The use of screens in the disclosed embodiments is particularly useful to increase and modulate the solids residence time of the mined material that have been selected expressly for providing additional treatment time.

An activated sludge process consists of a bioreactor that is used for the treatment of wastewater, or other liquor such as from internal sidestreams. The bioreactor is connected to a separation device, which may include a clarifier, an upflow granular reactor, a membrane, a filter, a dissolved air floatation device, or any other separation device, for the recycling or removal of biomass. The screens of the disclosed embodiments may be used in such an activated sludge process.

Figure 1B:
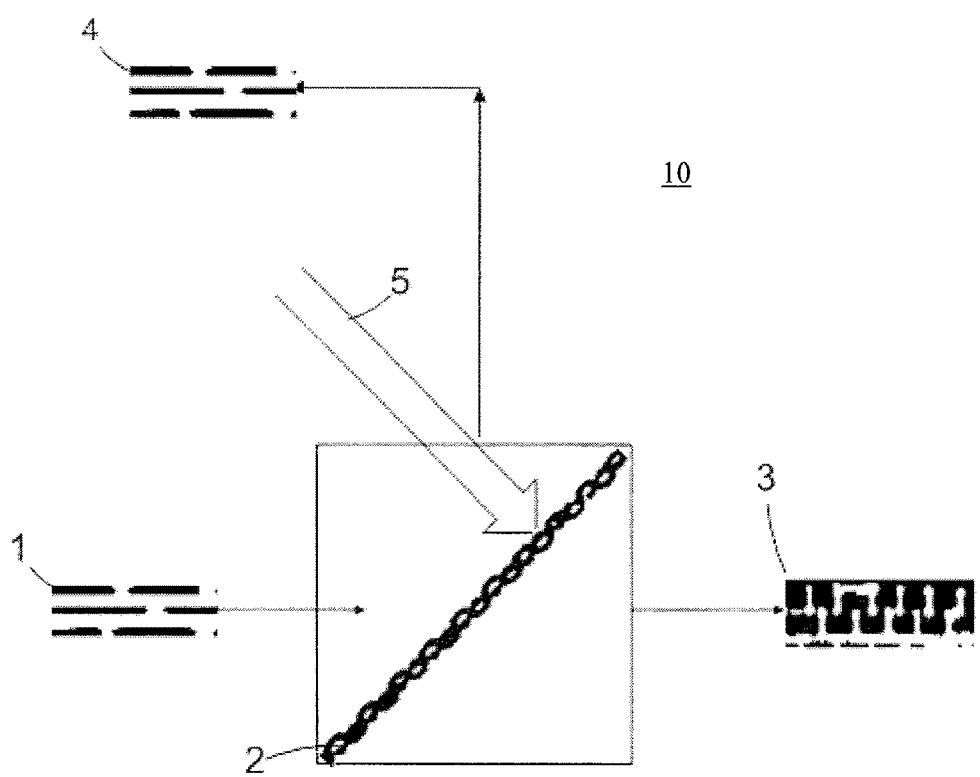
Figure 1C:
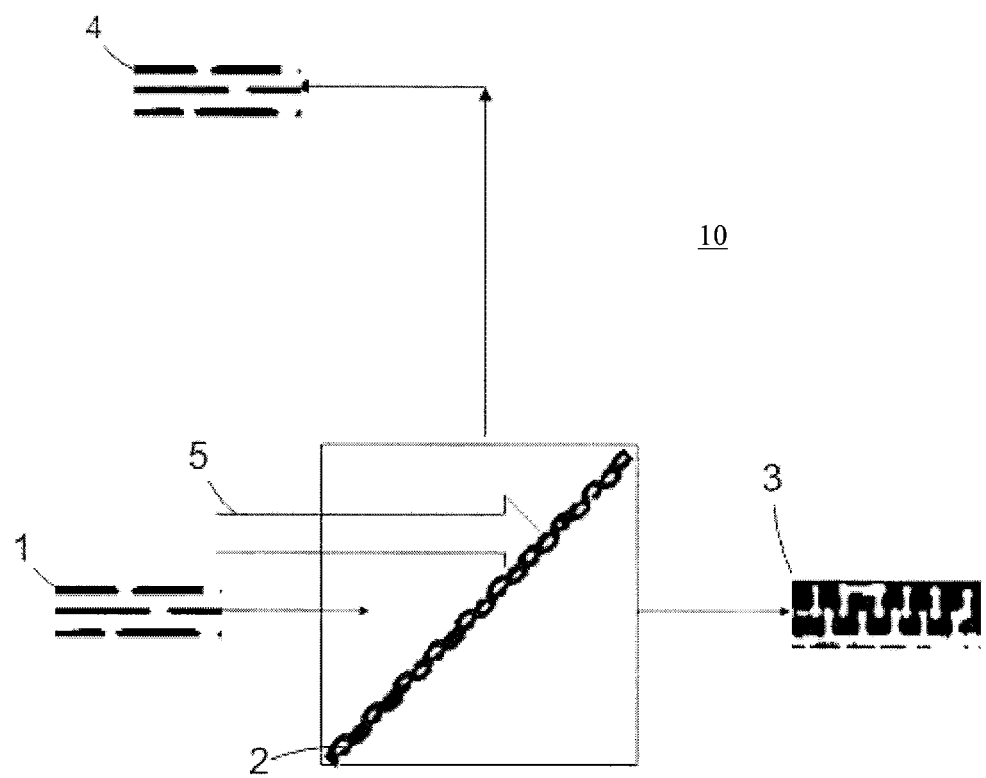

FIGS. 1(a)-1(c) show three perspective views of one example embodiment of the screening apparatus 10. As shown in these figures, the screening apparatus 10 processes an entering wastewater stream 1 via an internal particle/solids separator 2 which screens waste constituents out to a waste stream 3 while separating them from those constituents of the wastewater stream 1 that are to be retained 4. Wastewater 1 can be pre-screened prior to entering screening apparatus 10 in order to remove larger trash or granules that need to be excluded from the process. The use of the screen 2 increases the solids retention time of the screened constituents 4 and provides a selection pressure for larger biological particles, thus uncoupling it from the solids retention time from the unscreened (pass through) constituents (waste stream 3). This uncoupling of solids retention time allows for additional reaction time for the screened constituents 4. The screening efficiency can be calibrated to increase or decrease the solids retention time of the screened constituents 4.

An optional screen wash 5 using gas, liquid or some combination of matter can be added to further assist in the screening process. This screen wash 5 can be directed toward the screen 2 in a variety of different ways, which differently affect the solids retention time, including but not limited to, along the vertical axis (FIG. 1(a)), an angle directly perpendicular to the screen (FIG. 1(b)), or along the horizontal axis (FIG. 1(c)).

Figure 2:
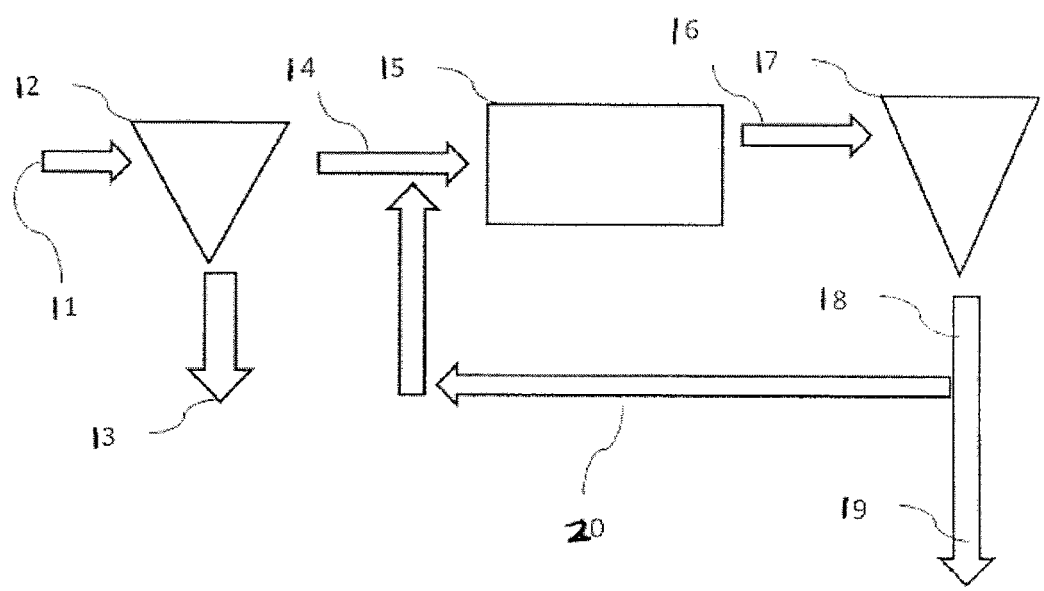
FIG. 2 is a flowchart showing a method for an activated sludge process in accordance with an example embodiment.

FIG. 2 is a flowchart showing a method for an activated sludge process in accordance with an example embodiment. Wastewater stream 11 enters into a primary separator 12. Excess wastewater 13 exits the process and the wastewater stream 14 enters a bioreactor 15. After exiting the bioreactor 15, the wastewater stream 16 enters into another separator 17. The separator 17 can be, for example, a clarifier, an upflow granular reactor, a membrane, a filter or a dissolved air floatation device. The remaining wastewater 18 is thus separated from activated sludge 19, some of which is recycled 20 to bioreactor 15 in order to efficiently process more out of the system as the remaining excess sludge exits the system.

Figure 3:
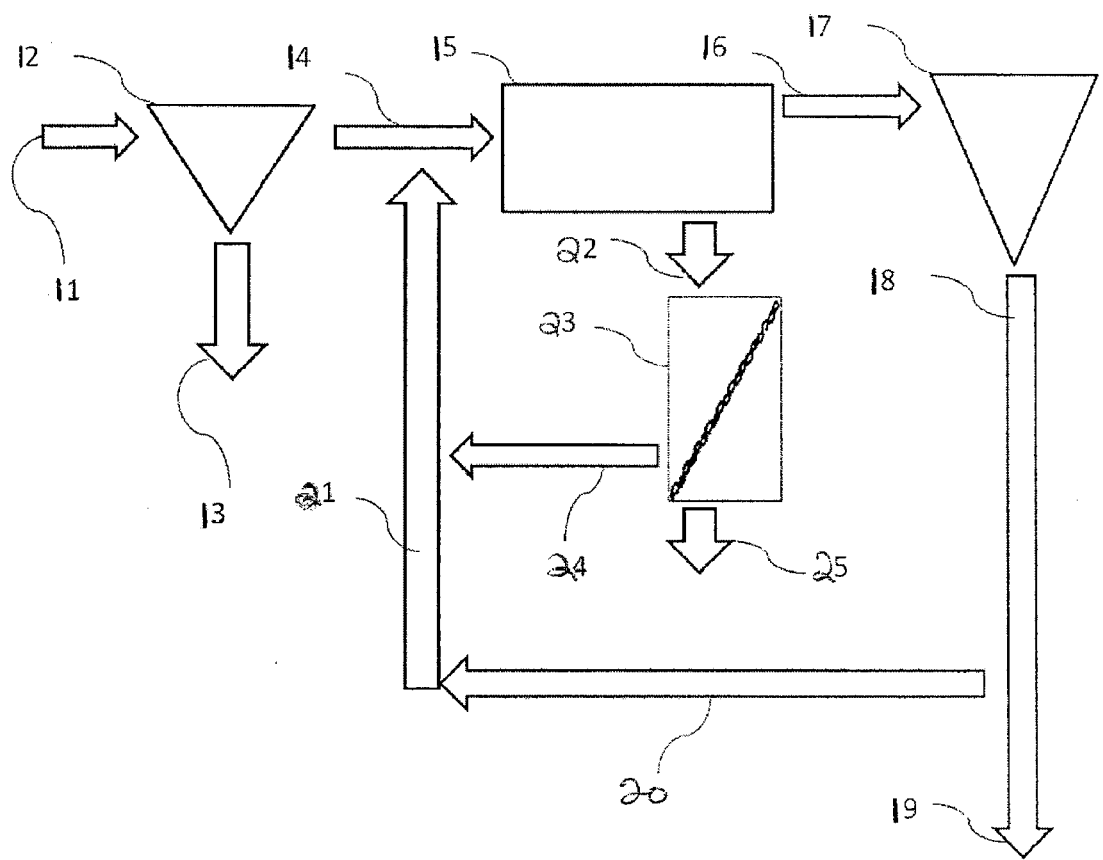
FIG. 3 is a flowchart showing another method for an activated sludge process in accordance with an example embodiment.

FIG. 3 is a flowchart showing another method for an activated sludge process in accordance with an example embodiment. The embodiment of FIG. 3 is similar to that of FIG. 2 (like elements are labeled the same and not described again) but includes an additional path 22 from the bioreactor 15 for mixed liquor which is processed by a screening apparatus 23 before being separated into a clear effluent stream 24 to be recycled into the system and an excess stream 25 to exit the system. The screen 23 can be integrated into the bioreactor 15 in a sequencing batch arrangement or can be separate from bioreactor 15 as shown in FIG. 3. The separation could occur through gravity or flotation. The solids retention time for the process depends on the amount of excess sludge that is removed continuously or periodically from the separation device, which may be similar to that shown in FIGS. 1(a)-1(c). An increase in excess sludge removal decreases the solids retention time and vice-versa.

Figure 4:
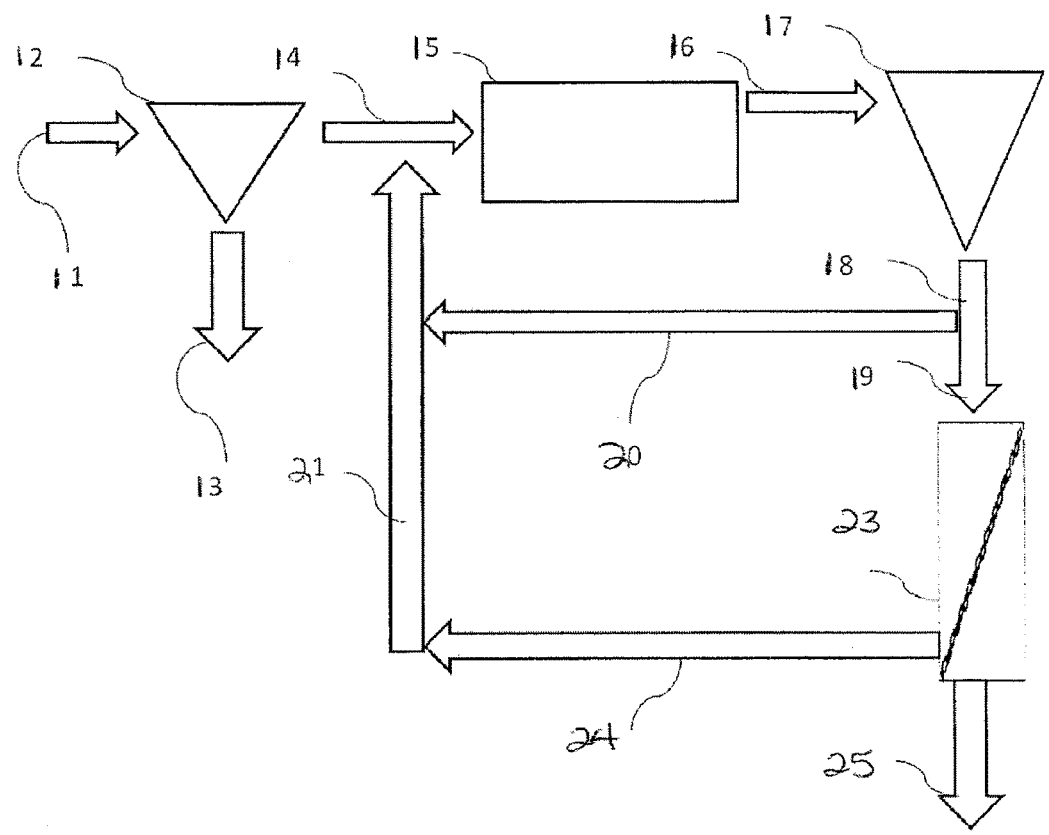
FIG. 4 is a flowchart showing another method for an activated sludge process in accordance with an example embodiment.

FIG. 4 is a flowchart showing another method for an activated sludge process in accordance with an example embodiment. As seen in FIG. 4, screen device 23 can be provided (either in parallel or in series with the biomass settlement/floatation device) in line with the excess sludge 19 withdrawal system, instead of as an additional path from the bioreactor 15 (as shown in FIG. 3). The excess sludge removal can occur directly from a separator 17 following the bioreactor 15. In this case the screen can be located at this alternate excess sludge withdrawal system from the bioreactor 19.

Figure 5:
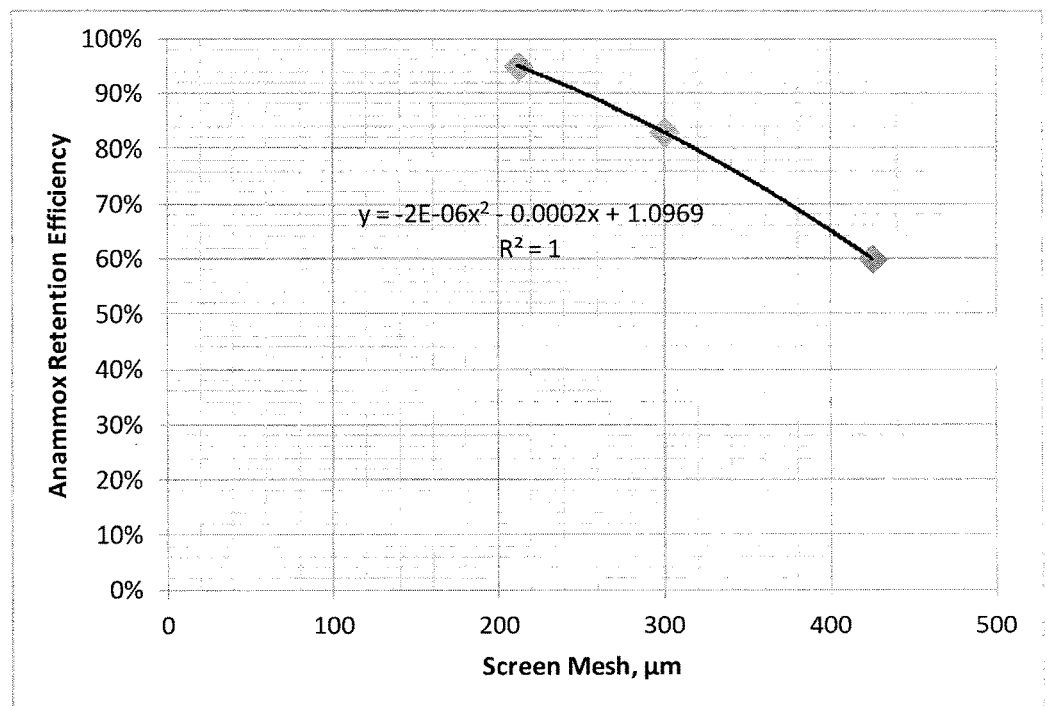
FIG. 5 is a graph showing data that describes the efficiency of a screen that retains granules based on size, according to an example embodiment.

FIG. 5 shows data describing the efficiency of a screen that retains granules based on size, according to an example embodiment. In this example, a 212 µm screen was used for selection and retention of anaerobic ammonium oxidation (anammox) bacteria granules. The graph in FIG. 5 shows the retention efficiency of granules greater than 212 µm.

The invention claimed is:

1. A system for treating wastewater, said system comprising:
    a bioreactor for treating the wastewater according to an activated sludge process; and
    a classifying screen for selectively screening material from mixed liquor or sludge, wherein the selection occurs based on resistance to compression or shear, where a fraction of the mixed liquor or sludge that is more resistant to compression or shear is retained, such that the fraction of the mixed liquor or sludge that is more resistant to compression or shear does not pass through the classifying screen, while a fraction of the mixed liquor or sludge that is less resistant to compression or shear passes through the classifying screen; and
    wherein the screening apparatus is configured to transmit the fraction of the mixed liquor or sludge that is more resistant to compression or shear, which fraction does not pass through the classifying screen and is thereby retained by the classifying screen, from the classifying screen to a portion of the bioreactor that is upstream from the classifying screen.

2. The system of claim 1, further comprising a solid-liquid separator selected from the group consisting of a clarifier, an upflow granular reactor, a membrane, a filter, and a dissolved air floatation device.

3. A method for separating two or more solids fractions from mixed liquor, to maintain two or more solids residence times, the method comprising:
providing the mixed liquor;
providing classifying screens within said mixed liquor;
preferentially selecting said fractions with a solids retention time higher than a desired threshold using said classifying screens; and
maintaining said fractions with a lower solids retention time by pass through or by using any other solid liquid separator;
wherein the solids retention times of the selected solids can be adjusted and requires a swapping of classifying screens size and/or solid-liquid separator for the higher and/or lower solids retention times respectively.

4. The method of claim 3, wherein said screen selects for granular solids while allowing for the passage of other solids.

5. The method of claim 3, wherein the preferential selection occurs based on particle size where the larger size is retained and the smaller size fraction passes through.

6. A method for separating two or more solids fractions from mixed liquor, to maintain two or more solids residence times, the method comprising:
providing the mixed liquor;
providing classifying screens within said mixed liquor;
preferentially selecting said fractions with a solids retention time higher than a desired threshold using said classifying screens; and
maintaining said fractions with a lower solids retention time using any other solid liquid separator;
wherein the preferential selection occurs based on resistance to compression or shear, where a fraction that is more resistant to compression or shear is retained.

7. The method of claim 6, wherein a series of screens can be used to select an upper and lower size range for selection.

8. The method of claim 6, wherein the two or more solids fractions include retained and passed through sludge fractions, and wherein the retained and passed through sludge fractions have relative proportions that can be modulated from a minimum of 0% to a maximum of 100% by weight.

9. A method of claim 4, wherein the non-granular solids can be comprised of flocculant or dispersed solids.

10. A method of claim 4, wherein the granular solids are selected and retained under aerobic, anoxic or anaerobic or a combination of these conditions.

11. A method of claim 3, wherein at least one of the classifying screens can be applied at any point in the biological wastewater treatment process including in the mixed liquor, the return sludge or the waste sludge.

12. A method of claim 6, wherein the screen-retained solids can be used for bioaugmentation in other processes.

13. A method of claim 6, wherein the screened solids are of biological origin and consist of slow growing organisms.

14. A method of claim 13, wherein the slow growing organisms include anaerobic ammonia oxidizing organisms or methanogenic organisms.

15. A method of claim 3, wherein the screen-retained solids are of biological origin and consist of organisms, that coexist symbiotically to develop niche fractions based on exposure to air or other substrates.

16. A method of claim 15, wherein the organisms include aerobic ammonia oxidizing organisms and/or anaerobic ammonia oxidizing organisms.

17. A method of claim 6, wherein the screen-retained solids have physicochemical properties and can be used as a resin, sorbent or catalyst to remove pollutants.

18. A method of claim 6, wherein the solids retention times of the selected solids can be adjusted.

19. A method of claim 18, wherein the adjustment of solids retention times requires a swapping of classifying screens size and/or solid-liquid separator for the higher and/or lower solids retention times respectively.

20. A method of claim 3, wherein the solids retention times are adjusted in response to detected readings.

21. The system of claim 1, wherein the classifying screen selectively retains granular anaerobic ammonium oxidizers while allowing compressible flocculant organisms to pass through.

22. The system of claim 1, further comprising a pressure wash for operating the classifying screen, a device for applying shear to the material, or a device for vibrating the classifying screen.

23. The system of claim 1, wherein the classifying screen has a mesh-size in the 10-1000 micron size range.

* * * * *